United States Patent
Chou et al.

(10) Patent No.: US 12,409,557 B2
(45) Date of Patent: Sep. 9, 2025

(54) TRAINING DATA GENERATION DEVICE, TRAINING DATA GENERATION METHOD USING THE SAME AND ROBOT ARM SYSTEM USING THE SAME

(71) Applicant: INDUSTRIAL TECHNOLOGY RESEARCH INSTITUTE, Hsinchu (TW)

(72) Inventors: Hung-Chun Chou, Taipei (TW); Yu-Ru Huang, Hualien (TW); Dong-Chen Tsai, Miaoli (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 229 days.

(21) Appl. No.: 17/961,921

(22) Filed: Oct. 7, 2022

(65) Prior Publication Data
US 2023/0150141 A1 May 18, 2023

(30) Foreign Application Priority Data
Nov. 12, 2021 (TW) ................. 110142173

(51) Int. Cl.
*B25J 11/00* (2006.01)
*B25J 9/16* (2006.01)
(Continued)

(52) U.S. Cl.
CPC ............ *B25J 9/1697* (2013.01); *B25J 9/163* (2013.01); *B25J 9/1635* (2013.01)

(58) Field of Classification Search
CPC ........ B25J 9/1697; B25J 9/163; B25J 9/1635; B25J 11/00; B25J 18/00; B25J 19/021;
(Continued)

(56) References Cited

U.S. PATENT DOCUMENTS 7,313,464 B1 * 12/2007 Perreault ................ B25J 9/1666
700/262
9,213,908 B2 12/2015 Benhimane et al.
(Continued)

FOREIGN PATENT DOCUMENTS

CN 111666919 A 9/2020
CN 110555878 B 4/2021
(Continued)

OTHER PUBLICATIONS

Baimukashev et al., "Deep Learning Based Object Recognition Using Physically-Realistic Synthetic Depth Scenes", Machine Learning and Knowledge Extraction, vol. 1, 2019, pp. 883-903.
(Continued)

*Primary Examiner* — Adam R Mott
*Assistant Examiner* — Heather J Keniry
(74) *Attorney, Agent, or Firm* — Birch, Stewart, Kolasch & Birch, LLP

(57) ABSTRACT

A training data generation device includes a virtual scene generation unit, an orthographic virtual camera, an object-occlusion determination unit, an object-occlusion determination unit and a perspective virtual camera. The virtual scene generation unit is configured for generating a virtual scene, wherein the virtual scene comprises a plurality of objects. The orthographic virtual camera is configured for capturing a vertical projection image of the virtual scene. The object-occlusion determination unit is configured for labeling an occluded-state of each object according to the vertical projection image. The perspective virtual camera is configured for capturing a perspective projection image of the virtual scene. The training data generation unit is configured for generating a training data of the virtual scene according to the perspective projection image and the occluded-state of each object.

13 Claims, 7 Drawing Sheets

(51) Int. Cl.
   *B25J 18/00* (2006.01)
   *B25J 19/02* (2006.01)
   *G06N 20/00* (2019.01)
(58) Field of Classification Search
   CPC ........... G05B 2219/40053; G05B 2219/40532; G06N 20/00
   See application file for complete search history.

(56) References Cited

U.S. PATENT DOCUMENTS

| | | | |
|---|---|---|---|
| 10,430,663 B2 | 10/2019 | Chiang et al. | |
| 10,442,086 B2 | 10/2019 | Chen et al. | |
| 10,713,794 B1 | 7/2020 | He et al. | |
| 2005/0286767 A1 | 12/2005 | Hager et al. | |
| 2010/0111370 A1 | 5/2010 | Black et al. | |
| 2014/0039679 A1 | 2/2014 | Ando | |
| 2016/0136808 A1* | 5/2016 | Konolige | B25J 9/1612 700/214 |
| 2017/0206431 A1 | 7/2017 | Sun et al. | |
| 2017/0252922 A1 | 9/2017 | Levine et al. | |
| 2018/0250820 A1 | 9/2018 | Shimodaira et al. | |
| 2019/0355150 A1 | 11/2019 | Tremblay et al. | |
| 2019/0361672 A1 | 11/2019 | Odhner et al. | |
| 2019/0366545 A1 | 12/2019 | Mefford et al. | |
| 2020/0306960 A1 | 10/2020 | Handa et al. | |
| 2020/0342652 A1* | 10/2020 | Rowell | G06V 10/82 |
| 2020/0361083 A1 | 11/2020 | Mousavian et al. | |
| 2020/0363815 A1 | 11/2020 | Mousavian et al. | |
| 2021/0081752 A1 | 3/2021 | Chao et al. | |
| 2021/0331311 A1* | 10/2021 | Fu | G06V 10/764 |
| 2022/0288783 A1* | 9/2022 | Sundermeyer | G06T 7/55 |
| 2022/0301304 A1* | 9/2022 | Hampali | G06T 7/73 |
| 2022/0405506 A1* | 12/2022 | Taamazyan | G06T 7/50 |

FOREIGN PATENT DOCUMENTS

| | | |
|---|---|---|
| CN | 112770875 A | 5/2021 |
| TW | 201738056 A | 11/2017 |
| TW | I708041 B | 10/2020 |
| TW | I708190 B | 10/2020 |
| WO | WO2018/035216 A1 | 2/2018 |
| WO | WO2020/106908 A1 | 5/2020 |
| WO | WO 2020/132372 A1 | 6/2020 |
| WO | WO 2020/160394 A1 | 8/2020 |
| WO | WO 2020/180863 A1 | 9/2020 |
| WO | WO 2020/185334 A1 | 9/2020 |
| WO | WO 2021/025800 A1 | 2/2021 |

OTHER PUBLICATIONS

Ehsani et al., "SeGAN: Segmenting and Generating the Invisible", IEEE Xplore, 2018, pp. 6144-6153.

Ke et al., "Deep Occlusion-Aware Instance Segmentation with Overlapping BiLayers", IEEE Xplore, 2021, pp. 4019-4028.

Wada et al., "Instance Segmentation of Visible and Occluded Regions for Finding and Picking Target from a Pile of Objects", IEEE/RSJ International Conference on Intelligent Robots and Systems, 2018, pp. 2048-2055.

Chinese Office Action and Search Report for Chinese Application No. 202111536541.2, dated Mar. 10, 2025.

* cited by examiner

TRAINING DATA GENERATION DEVICE, TRAINING DATA GENERATION METHOD USING THE SAME AND ROBOT ARM SYSTEM USING THE SAME

This application claims the benefit of Taiwan application Serial No. 110142173, filed Nov. 12, 2021, the subject matter of which is incorporated herein by reference.

TECHNICAL FIELD

The disclosure relates in general to a training data generation device, a training data generation method using the same and a robot arm system using the same.

BACKGROUND

In the field of picking-up object, when a robotic arm picks up an actual object that is occluded (covered by another object), it is easy to cause problems of, for example, object jamming, object damage and/or failure to pick up the object. Therefore, how to improve the success rate of picking up the object is one of the goals of those skilled in the art.

SUMMARY

According to an embodiment, a training data generation device is provided. The training data generation device includes a virtual scene generation unit of a processor, an orthographic virtual camera of the processor, an object-occlusion determination unit of the processor, a perspective virtual camera of the processor and a training data generation unit of the processor. The virtual scene generation unit is configured for generating a virtual scene, wherein the virtual scene comprises a plurality of objects. The orthographic virtual camera is configured for capturing a vertical projection image of the virtual scene. The object-occlusion determination unit is configured for labeling an occluded-state of each object according to the vertical projection image. The perspective virtual camera is configured for capturing a perspective projection image of the virtual scene. The training data generation unit is configured for generating a training data of the virtual scene according to the perspective projection image and the occluded-state of each object.

According to another embodiment, a training data generation method is provided. The training data generation method implemented by a processor includes the following steps: generating a virtual scene, wherein the virtual scene comprises a plurality of objects; capturing a vertical projection image of the virtual scene; labeling an occluded-state of each object according to the vertical projection image; capturing a perspective projection image of the virtual scene; and generating training data of the virtual scene according to the perspective projection image and the occluded-state of each object.

According to another embodiment, a robot arm system is provided. The robotic arm system includes a learning model generated by a training data generation method. The training data generation method implemented by a processor includes the following steps: generating a virtual scene, wherein the virtual scene comprises a plurality of objects; capturing a vertical projection image of the virtual scene; labeling an occluded-state of each object according to the vertical projection image; capturing a perspective projection image of the virtual scene; and generating training data of the virtual scene according to the perspective projection image and the occluded-state of each object. The robotic arm system includes a robotic arm, a perspective camera and a controller. The perspective camera is disposed on the robotic arm and configured for capturing an actual object image of a plurality of actual objects. The controller is configured for analyzing the actual object image according to the learning model, accordingly determining an actual occluded-state of each actual object, and controlling the robotic arm to pick up the actual object whose the actual occluded-state is un-occluded.

The above and other aspects of the disclosure will become better understood with regard to the following detailed description of the preferred but non-limiting embodiment (s). The following description is made with reference to the accompanying drawings.

Figure 1A:
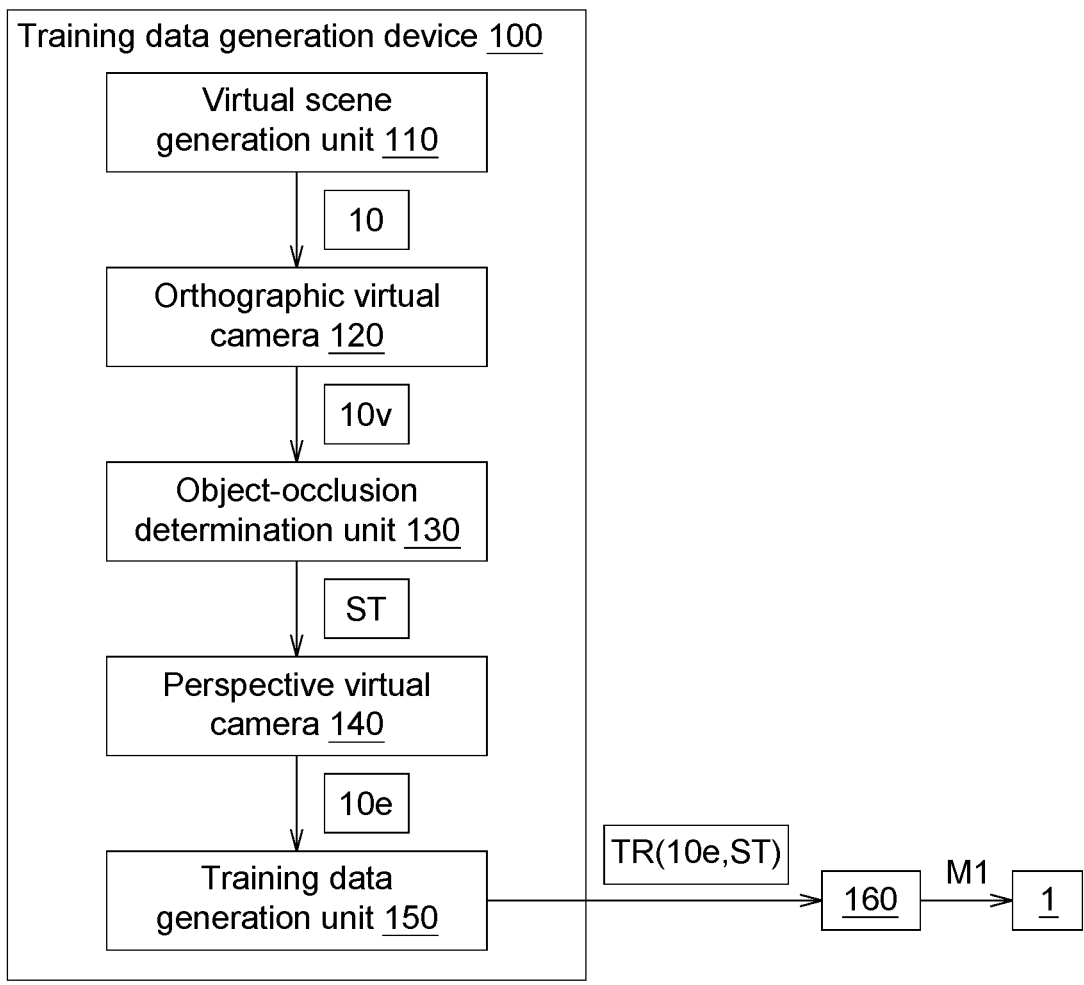
FIG. 1A illustrates a functional block diagram of a training data generation device according to an embodiment of the present disclosure.

In the following detailed description, for purposes of explanation, numerous specific details are set forth in order to provide a thorough understanding of the disclosed embodiments. It will be apparent, however, that one or more embodiments could be practiced without these specific details. In other instances, well-known structures and devices are schematically shown in order to simplify the drawing.

DETAILED DESCRIPTION

Figure 1B:
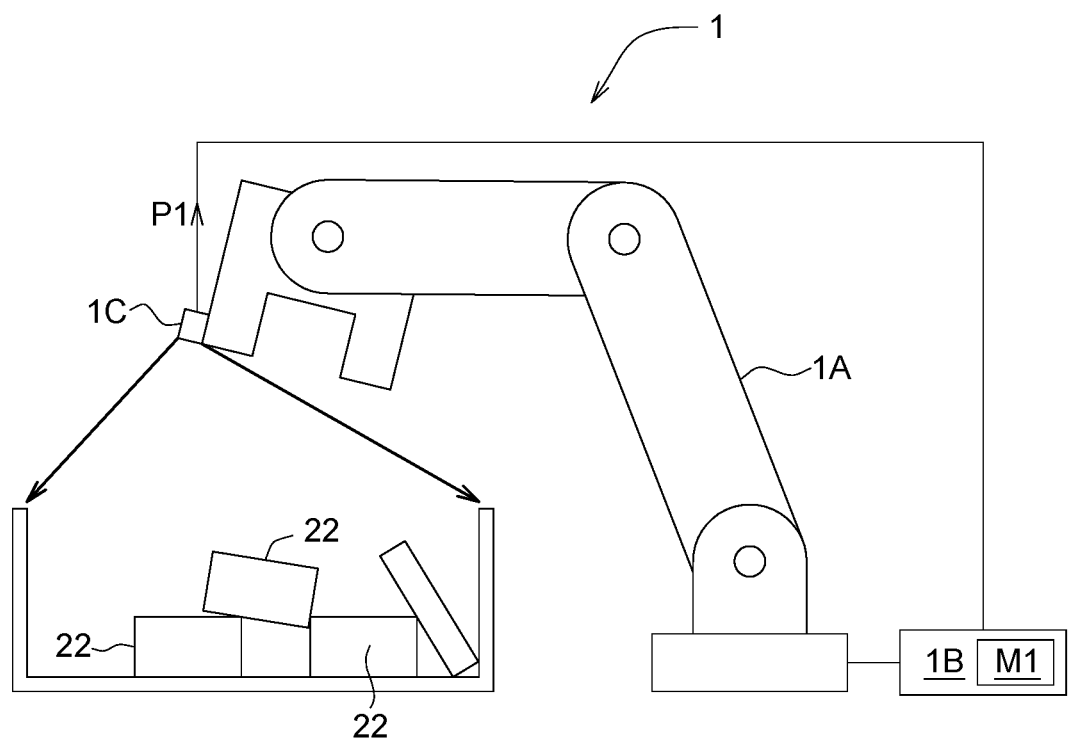
FIG. 1B illustrates a schematic diagram of a robotic arm system according to an embodiment of the present disclosure.
Figure 2:
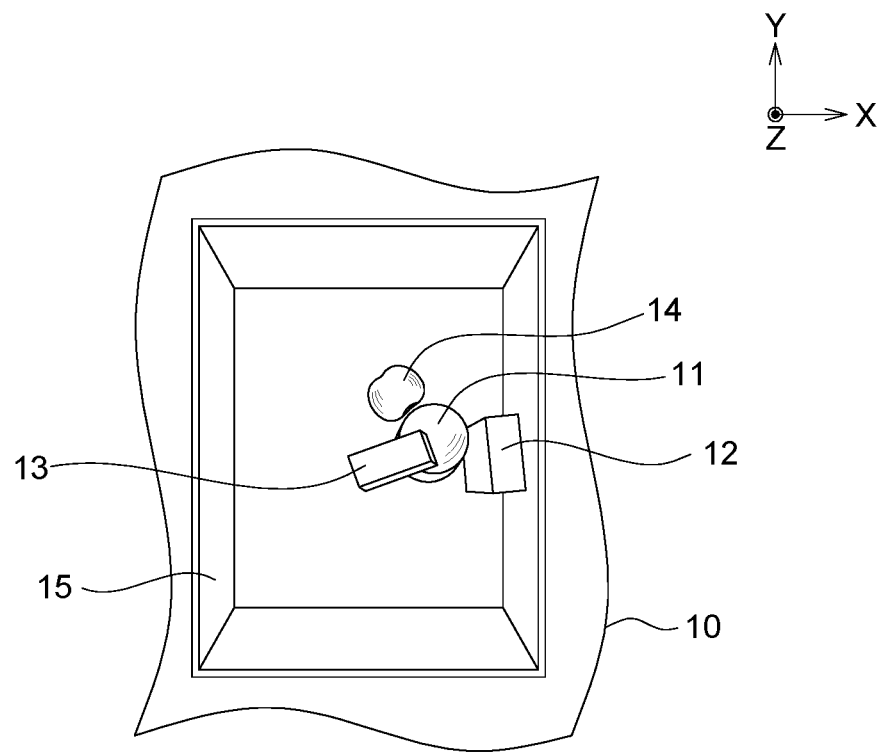
FIG. 2 illustrates a schematic diagram of a virtual scene of FIG. 1.
Figure 3A:
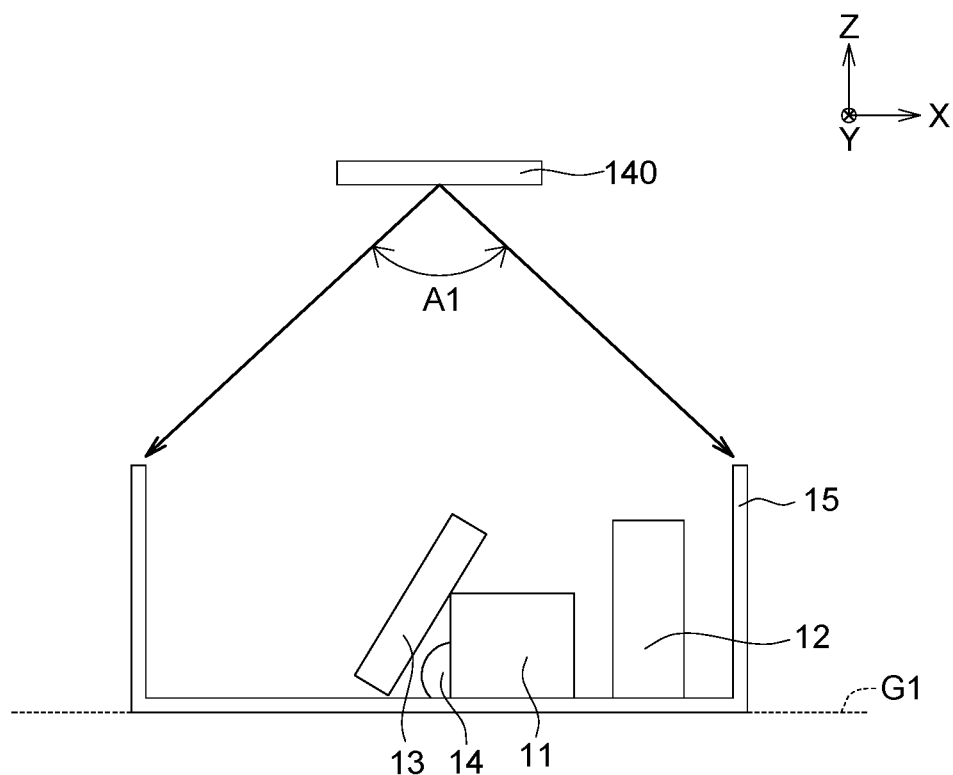
FIG. 3A illustrates a schematic diagram of a perspective virtual camera of FIG. 1 capturing a perspective projection image.
Figure 3B:
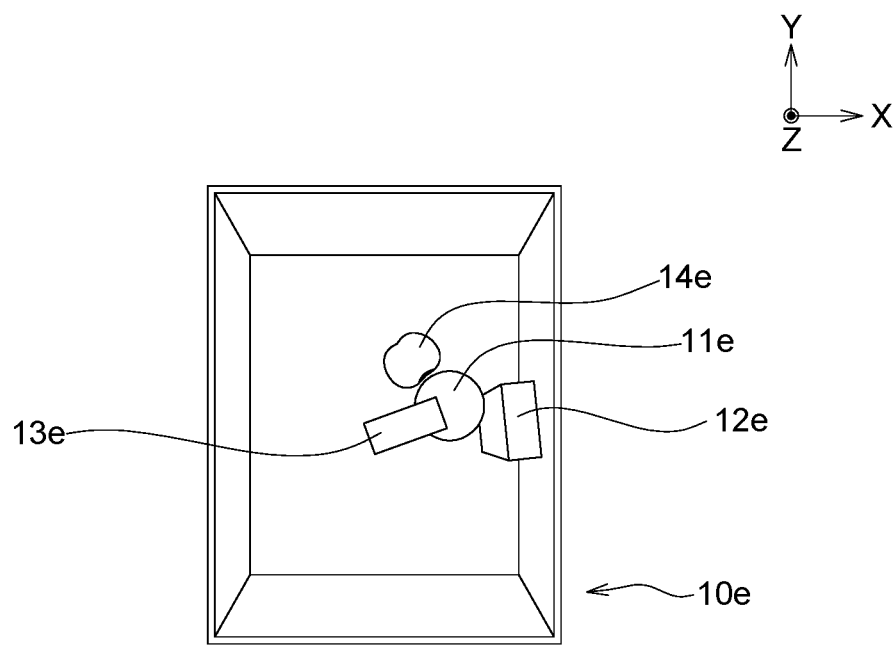
FIG. 3B illustrates a schematic diagram of the perspective projection image of the virtual scene of FIG. 2.
Figure 4A:
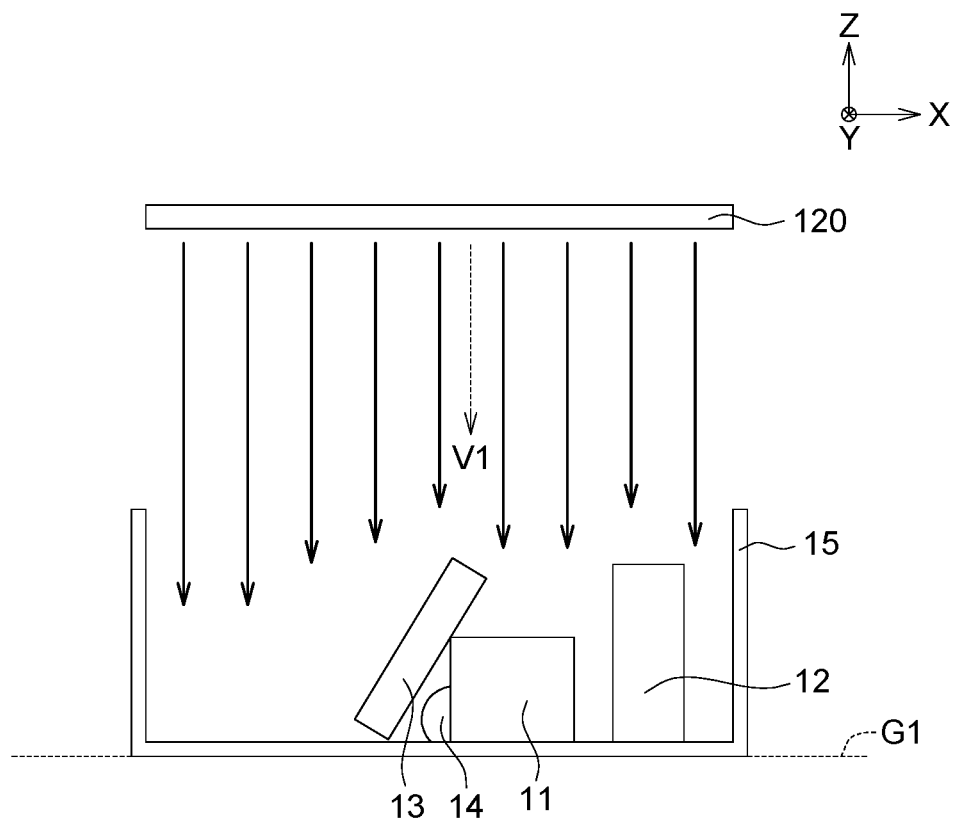
FIG. 4A illustrates a schematic diagram of an orthographic virtual camera of FIG. 1 capturing a vertical projection image.
Figure 4B:
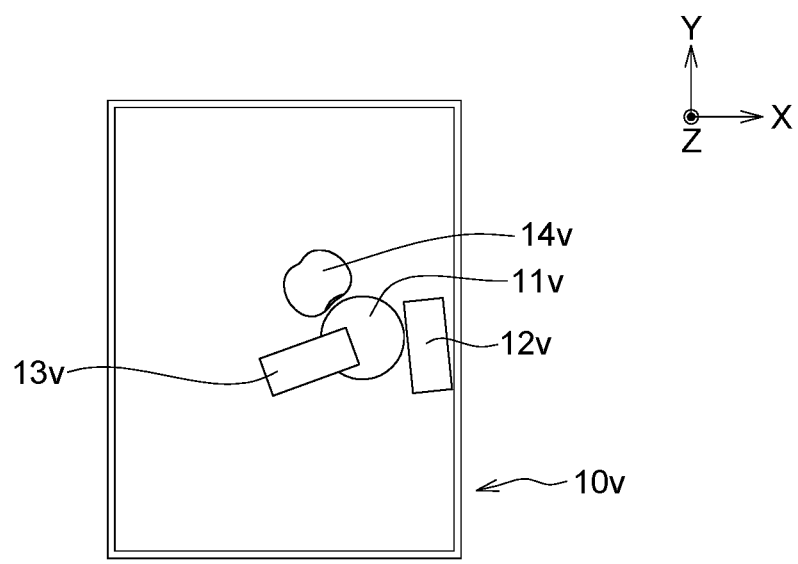
FIG. 4B illustrates a schematic diagram of the vertical projection image of the virtual scene of FIG. 2.

Referring to FIGS. 1A to 4B, FIG. 1A illustrates a functional block diagram of a training data generation device 100 according to an embodiment of the present disclosure, FIG. 1B illustrates a schematic diagram of a robotic arm system 1 according to an embodiment of the present disclosure, FIG. 2 illustrates a schematic diagram of a virtual scene 10 of FIG. 1, FIG. 3A illustrates a schematic diagram of a perspective virtual camera 140 of FIG. 1 capturing a perspective projection image 10e, FIG. 3B illustrates a schematic diagram of the perspective projection image 10e of the virtual scene 10 of FIG. 2, FIG. 4A illustrates a schematic diagram of an orthographic virtual camera 120 of FIG. 1 capturing a vertical projection image 10v, and FIG. 4B illustrates a schematic diagram of the vertical projection image 10v of the virtual scene 10 of FIG. 2.

As shown in FIG. 1A, the training data generation device 100 includes a virtual scene generation unit 110, the orthographic virtual camera 120, an object-occlusion determination unit 130, the perspective virtual camera 140 and a training data generation unit 150. At least one of the virtual scene generation unit 110, the orthographic virtual camera 120, the object-occlusion determination unit 130, the perspective virtual camera 140 and the training data generation unit 150 is, for example, software, firmware or a physical circuit formed by semiconductor processes. At least one of the virtual scene generation unit 110, the orthographic virtual camera 120, the object-occlusion determination unit 130, the perspective virtual camera 140 and the training data generation unit 150 could be integrated into a single unit or integrated into a processor or a controller.

As shown in FIG. 1A, the virtual scene generation unit 110 is configured to generate the virtual scene 10 including a number of objects 11 to 14. The orthographic virtual camera 120 is configured for capturing the vertical projection image 10v of the virtual scene 10 (the vertical projection image 10v is shown in FIG. 4B). The object-occlusion determination unit 130 is configured to label an occluded-state ST of each of the objects 11 to 14 (the objects 11 to 14 are shown in FIG. 2) according to the vertical projection image 10v. The perspective virtual camera 140 is configured to capture the perspective projection image 10e of the virtual scene 10. The training data generation unit 150 is configured for generating a training data TR of the virtual scene 10 according to the perspective projection image 10e and the occluded-state ST of each object 10. For example, each training data TR includes the perspective projection image 10e and the occluded-state ST of each object 10. Compared with the perspective projection image 10e, the vertical projection image 10v could much better reflect the actual occluded-state of the objects 11 to 14, so that the occluded-state ST determined according to the vertical projection image 10v could much better match the actual occluded-state of the object. As a result, a learning model M1 (the learning model M1 is shown in FIG. 1A) which is subsequently generated according to the training data TR could be used to more accurately determine the actual occluded-state of an actual object. The aforementioned occluded-state ST includes, for example, a number of categories, for example, two categories such as "occluded" and "un-occluded".

The so-called "virtual camera" herein, for example, projects a three-dimensional (3D) scene onto a reference surface (for example, a plane) to become a two-dimensional (2D) image by using computer vision technology. In addition, the aforementioned virtual scene 10, the perspective projection image 10e and the vertical projection image 10v could be data during the operation of the unit, not necessarily real image.

As shown in FIG. 1A, the training data generation device 100 could generate a number of the virtual scenes 10 and accordingly generate the training data TR of each virtual scene 10. A machine learning unit 160 could generate the learning model M1 by learning the occluding determination of the object according to a number of the training data TR. The machine learning unit 160 could be a sub-element of the training data generation device 100, or could be independently disposed with respect to the training data generation device 100, or the machine learning unit 160 could be disposed on the robotic arm system 1 (the robotic arm system 1 is shown in FIG. 1B). In addition, the learning model M1 generated by the machine learning unit 160 is obtained by using, for example, Mask R-CNN (object segmentation), Faster-R-CNN (object detection) or other types of machine learning techniques or algorithms.

As shown in FIG. 1B, the robotic arm system 1 includes a robotic arm 1A, a controller 1B and a perspective camera 1C. The perspective camera 1C is an actual (physical) camera. The robotic arm 1A could capture (or pick up) an actual object 22, for example, by gripping or sucking (vacuum suction or magnetic suction). In the actual object picking application, the perspective camera 1C could capture the actual object images P1 of the underneath actual objects 22. The controller 1B is electrically connected to the robotic arm 1A and the perspective camera 1C and could determine the actual occluded-state of the actual object 22 according to (or by analyzing) the actual object image P1 and control the robotic arm 1A to capture the underneath actual object 22. The controller 1B could load in the aforementioned trained learning model M1. Since the learning model M1 (the learning model M1 is shown in FIG. 1A) trained and generated according to the training data TR could be used to more accurately determine the actual occluded-state of the actual object 22, the controller 1B of the robotic arm system 1 could accurately determine the actual occluded-state of the actual object 22 in the actual scene according to the learning model M1 and then control the robot arm 1A to successfully capture (or pick up) the actual object 22. For example, the robot arm 1A captures the actual object 22 that is not occluded at all (for example, the actual object 22 whose actual occluded-state is "un-occluded"). As a result, in the actual object picking application, it could increase the success rate of picking up objects and/or improve the problems of object damage and object jamming.

In addition, as shown in FIG. 1B, the perspective camera 1C disposed on the robotic arm system 1 captures the actual object image P1 by the perspective projection principle or method. The actual object image P1 captured by the perspective camera 1C and the perspective projection image 10e based on the learning model M1 are obtained by the same perspective projection principle or method, and thus the controller 1B could accurately determine the occluded-state of the object.

As shown in FIGS. 1A and 2, the virtual scene generation unit 110 generates the virtual scene 10 by using, for example, V-REP (Virtual Robot Experiment Platform) technology. Each virtual scene 10 is, for example, a randomly generated 3D scene. As shown in FIG. 2, the virtual scene 10 includes, for example, a virtual container 15 and a number of virtual objects 11 located within the virtual container 15. The stacking status of the objects, the arrangement status of the objects and/or the number of objects in each virtual scene 10 are also randomly generated by the virtual scene generation unit 110. For example, the objects are disorderly stacked, randomly arranged and/or closely arranged. Therefore, the stacking status of the objects, the arrangement status of the objects and/or the number of the objects in each virtual scene 10 are not completely identical. In addition, the objects in the virtual scene 10 could be any type of objects, for example, hand tools, stationery, plastic bottle, food materials, mechanical parts and other objects used in factories, such as a machinery processing factory, a food processing factory, a stationery factory, a resource recycling factory, an electronic device processing factory, an electronic device assembly factory, etc. The 3D model of the object and/or the container 15 could be made in advance by using modeling software, and the virtual scene generation unit 110 generates the virtual scene 10 according to the pre-modeled 3D model of the object and/or the container 15.

As shown in FIG. 3A, the perspective virtual camera 140, as like general perspective camera (with a conical angle-of-view A1), photograph the virtual scene 10 to obtain the perspective projection image 10e (the perspective projection image 10e is shown in FIG. 3B). As shown in FIG. 3B, the perspective projection image 10e is, for example, a perspective projection 2D image of the virtual scene 10 (3D scene), wherein the perspective projection 2D image includes a number of perspective projection object images 11e to 14e corresponding to the objects 11 to 14 in FIG. 2. Viewed from the perspective projection image 10e, the perspective projection object images 11e to 13e overlap each other. For example, the perspective projection object image 12e is occluded (or shielded, or covered) by the perspective projection object image 11e. Thus, the object occluded-state of the perspective projection object image 12e is determined to be "occluded" accordion to the perspective projection image 10e, but it is not the actual occluded-state of the perspective projection object image 12e in the virtual scene 10.

As shown in FIG. 4A, the orthographic virtual camera 120 photograph, with a vertical line-of-sight V1, the virtual scene 10 to obtain the vertical projection image 10v (the vertical projection image 10v is shown in FIG. 4B). As shown in FIG. 4B, the vertical projection image 10v is, for example, a vertical projection 2D image of the virtual scene 10 (3D scene), wherein the vertical projection 2D image includes a number of vertical projection object images 11v to 14v corresponding to the objects 11 to 14 of FIG. 2. As viewed from the vertical projection image 10v, the vertical projection object image 12v is not occluded by the vertical projection object image 11v. Thus, the actual occluded-state of the vertical projection object image 12v is determined to be "un-occluded" according to the vertical projection image 10v. Due to the occluded-state ST of the object in the embodiment of the present disclosure being determined according to the vertical projection image 10v, it could reflect the actual occluded-state of each object in the virtual scene 10.

As shown in FIG. 4A, the aforementioned objects 11 to 14 (or the container 15) are placed relative to a carrying surface G1, and the vertical projection image 10v of FIG. 4B is generated by viewing the virtual scene 10 in the vertical line-of-sight V1. The vertical line-of-sight V1 referred to herein is, for example, perpendicular to the carrying surface G1. In the present embodiment, the carrying surface G1 is, for example, a horizontal surface. In another embodiment, the carrying surface G1 could be an inclined surface, and the vertical line-of-sight V1 is also perpendicular to the inclined carrying surface G1. Alternatively, the direction of the vertical line-of-sight V1 could be defined to be consistent with or parallel to a direction of the robotic arm (not shown) picking up the object.

In addition, the embodiments of the present disclosure could determine the occluded-state of the object using a variety of methods, and one of which will be described below.

Figure 5A:
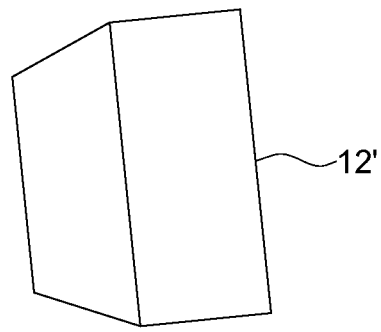
FIG. 5A illustrates a schematic diagram of a target object scene of the object of FIG. 2 being a target object.
Figure 5B:
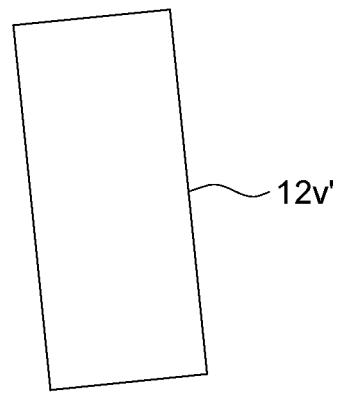
FIG. 5B illustrates a schematic diagram of a vertical projection object image of the target object scene of FIG. 5A.
Figure 5C:
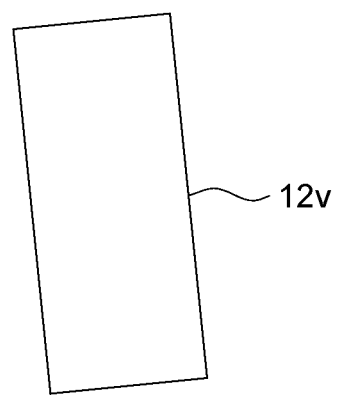
FIG. 5C illustrates a schematic diagram of the vertical projection object image of FIG. 4B.

Referring to FIGS. 5A to 5C, FIG. 5A illustrates a schematic diagram of a target object scene 12' of the object 12 of FIG. 2 being a target object, FIG. 5B illustrates a schematic diagram of a vertical projection object image 12v' of the target object scene 12' of FIG. 5A, and FIG. 5C illustrates a schematic diagram of the vertical projection object image 12v of FIG. 4B.

The object-occlusion determination unit 130 is further configured for hiding the objects other than the target one in the virtual scene, and correspondingly generating the target object scene of the target one. The orthographic virtual camera 120 is further configured for obtaining the vertical projection object image of the target object scene. The object-occlusion determination unit 130 is further configured for obtaining a difference value between the vertical projection object image of the target object scene and the vertical projection object image of the target object of the vertical projection image and determining the occluded-state ST according to the difference value. The object-occlusion determination unit 130 is configured for determining whether the difference value is smaller than a preset value, determining that the occluded-state of the target object is "un-occluded" when the difference value is smaller than the preset value, and determining the occluded-state of the target object is "occluded" when the difference value is not smaller than the preset value. The unit of the aforementioned "preset value" is, for example, the number of pixels. The embodiments of the present disclosure do not limit the numerical range of the "preset value", and it could depend on actual conditions.

In the case of the object 12 being the target object, as shown in FIG. 5A, the object-occlusion determination unit 130 hides the objects 11 and 13-14 other than the object 12 in the virtual scene 10 of FIG. 2. For example, the object-occlusion determination unit 130 sets the object 12 as "visible state" while sets the other objects 11 and 13 to 14 as "invisible state". Then, the object-occlusion determination unit 130 accordingly generates the target object scene 12' of the object 12. As shown in FIG. 5B, the orthographic virtual camera 120 captures the vertical projection object image 12v' of the target object scene 12'. The object-occlusion determination unit 130 obtains the difference value between the vertical projection object image 12v' of the target object scene 12' and the vertical projection object image 12v (vertical projection object image 12v is shown in FIG. 5C) of the object 12 of the vertical projection image 10v, and determines the occluded-state ST according to the difference value. If the difference between the vertical projection object image 12v and the vertical projection object image 12v' is substantially equal to 0 or less than a preset value, it means that the object 12 is not occluded, and accordingly the object-occlusion determination unit 130 could determine that the occluded-state ST of the object 12 is "un-occluded". Conversely, if the difference between the vertical projection object image 12v and the vertical projection object image 12v' is not equal to 0 or not less than the preset value, it means that the object 12 is occluded, and accordingly the object-occlusion determination unit 130 could determine that the occluded-state ST of the object 12. ST is "occluded". In addition, the aforementioned preset value is greater than 0, for example, 50, but it could also be any integer less than or greater than 50.

The occluded-state of each object in the virtual scene 10 could be determined by using the same manner. For example, the training data generation device 100 could determine, by using the same manner, the occluded-states ST of the objects 11, 13 and 14 in the virtual scene 10 of FIG. 2 as "occluded", "un-occluded" and "un-occluded" respectively, as shown in FIG. 4B.

Figure 6:
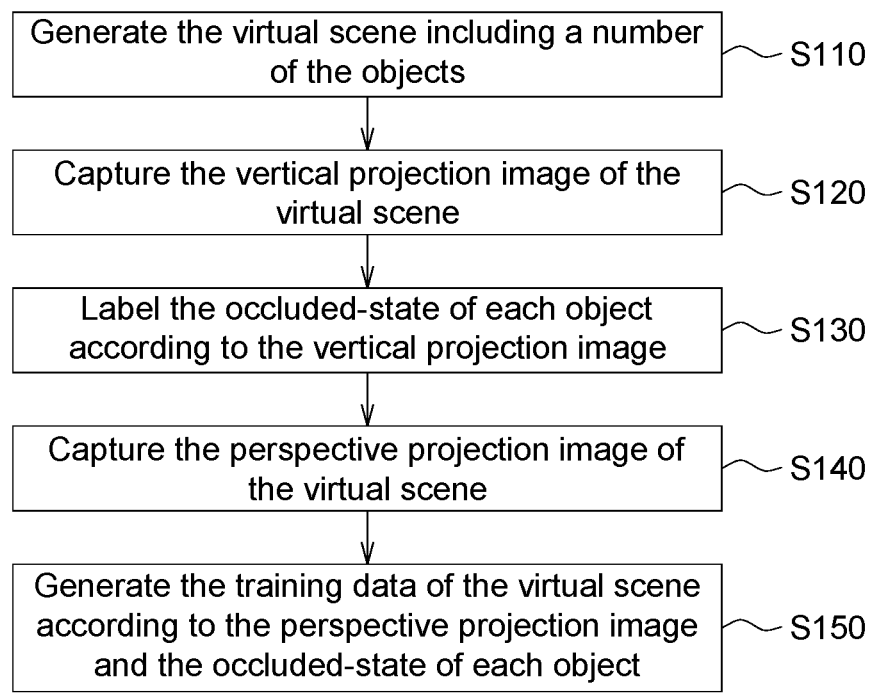
FIG. 6 illustrates a flowchart of a training data generation method using the training data generation device of FIG. 1A.

Referring to FIG. 6, FIG. 6 illustrates a flowchart of a training data generation method using the training data generation device 100 of FIG. 1A.

In step S110, as shown in FIG. 2, the virtual scene generation unit 110 generates the virtual scene 10 by using, for example, the V-REP technology. The virtual scene 10 includes a number of the virtual objects 11 to 14 and the virtual container 15.

In step S120, as shown in FIG. 4B, the orthographic virtual camera 120 captures the vertical projection image 10v of the virtual scene 10 by using computer vision technology. The capturing method is, for example, to convert the 3D virtual scene 10 into the 2D vertical projection image 10v by using computer vision technology. However, as long as the 3D virtual scene 10 could be converted into the 2D vertical projection image 10v, the embodiment of the present disclosure does not limit the processing technology, and it could even be a suitable conventional technology.

In step S130, as shown in FIG. 1B, the object-occlusion determination unit 130 labels the occluded-state ST of each of the object 11 to 14 according to the vertical projection image 10v. The method of determining the occluded-state ST of the object has been described above, and the similarities will not be repeated here.

In step S140, as shown in FIG. 3B, the perspective virtual camera 140 captures the perspective projection image 10e of the virtual scene 10 by using, for example, computer vision technology. The capturing method is, for example, to convert the 3D virtual scene 10 into the 2D perspective projection image 10e by using computer vision technology. However, as long as the 3D virtual scene 10 could be converted into the 2D perspective projection image 10e, the embodiment of the present disclosure does not limit the processing technology, and it could even be a suitable conventional technology.

In step S150, as shown in FIG. 1B, the training data generation unit 150 generates the training data TR of the virtual scene 10 according to the perspective projection image 10e and the occluded-state ST of each of the objects 11 to 14. For example, the training data generation unit 150 integrates the data of the perspective projection image 10e and the data of the occluded-states ST of the objects 11 to 14 into one training data TR.

After obtaining one training data TR, the training data generation device 100 could generate the training data TR of the next virtual scene 10 by repeating steps S110 to S150, wherein such training data TR includes the perspective projection image 10e and the occluded-state ST of each object of the next virtual scene 10. According to such principle, the training data generation device 100 could obtain N training data TR. The embodiments of the present disclosure do not limit the value of N, and the value could be a positive integer equal to or greater than 2, such as 10, 100, 1000, 10000, or even more or less.

Figure 7:
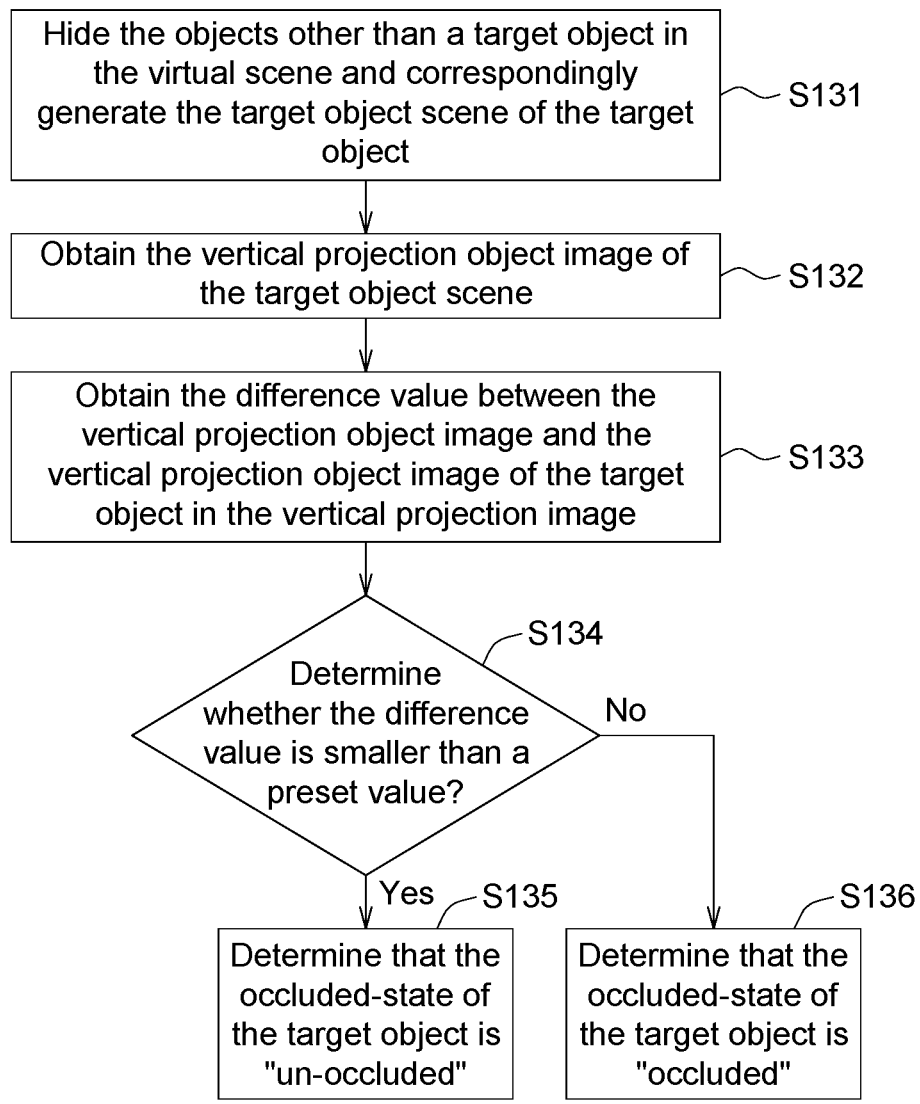
FIG. 7 illustrates a flowchart of the method of determining the occluded-state in step S130 of FIG. 6.

Referring to FIG. 7, FIG. 7 illustrates a flowchart of the method of determining the occluded-state in step 130 of FIG. 6. The following description takes the object 12 of FIG. 2 as the target object, and the determining method for the occluded-state ST of the other objects is the same, and the similarities will not be repeated here.

In step S131, the object-occlusion determination unit 130 hides the objects 11 and 13 to 14 other than the object 12 in the virtual scene 10, and accordingly generates the target object scene 12' of the object 12, as shown in FIG. 5A.

In step S132, the orthographic virtual camera 120 captures the vertical projection object image 12v' of the target object scene 12' by using, for example, computer vision technology, as shown in FIG. 5B. The capturing method of the vertical projection object image 12v' is the same as that of the aforementioned vertical projection image 10v.

In step S133, the object-occlusion determination unit 130 obtains the difference value between the vertical projection object image 12v' (the vertical projection object image 12v' is shown in FIG. 5B) and the vertical projection object image 12v (the vertical projection object image 12v is shown in FIG. 5C) of the vertical projection image 10v (the vertical projection image 10v is shown in FIG. 4B). For example, the object-occlusion determination unit 130 performs a subtraction calculation between the vertical projection object image 12v' and the vertical projection object image 12v, and uses the absolute value of result of the subtraction calculation as the difference value.

In step S134, the object-occlusion determination unit 130 determines whether the difference value is smaller than the preset value. If the difference value is less than the preset value, the process proceeds to step S135, and the object-occlusion determination unit 130 determines that the occluded-state ST of the object 12 is "un-occluded"; if the difference value is not less than the preset value, the process proceeds to step S136, and the object-occlusion determination unit 130 determines that the occluded-state ST of the object 12 is "occluded".

In an experiment, the learning model M1 is obtained, according to 2000 virtual scenes, by using mask-r-cnn of machine learning technology. The controller 1C performs, for a number of the actual object images of a number of the actual scenes (the decoration of the actual objects in each scene may be different), the determination of the actual occluded-state of the actual object according to the learning model M1. According to the experimental results, a mean average precision (mAP) obtained by using the training data generation method of the embodiment of the present disclosure ranges between 70% and 95%, or even higher, while the mean average precision obtained by using the conventional training data generation method is normally not more than 50%. The aforementioned mean average precision is obtained under 0.5 IoU (Intersection Over Union). In comparison with the conventional training data generation method, the training data generation method of the disclosed embodiment does have much higher mean average precision.

To sum up, an embodiment of the present disclosure provides a training data generation device and a training data generation method using the same, which could generate at least one training data. The training data includes the occluded-state of each object in the virtual scene and the perspective projection image of the virtual scene. The occluded-state of each object is obtained according to the vertical projection image of the virtual scene captured by the orthographic virtual camera, and thus it could reflect the actual occluded-state of the object. The perspective projection image is obtained by using the projection principle which is the same as that of the general perspective camera for actual picking-up object, and thus the mechanical system could accurately determine the occluded-state of the actual object. As a result, the learning model generated according to (or learning) the aforementioned training data could improve the mean average precision of the robotic arm system in actual picking-up object.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A training data generation device, comprising:
a virtual scene generation unit of a processor configured for generating a virtual scene, wherein the virtual scene comprises a plurality of objects;
an orthographic virtual camera of the processor configured for capturing a vertical projection image of the virtual scene;
an object-occlusion determination unit of the processor configured for labeling an occluded-state of each object according to the vertical projection image;
a perspective virtual camera of the processor configured for capturing a perspective projection image of the virtual scene; and
a training data generation unit of the processor configured for generating a training data of the virtual scene according to the perspective projection image and the occluded-state of each object.

2. The training data generation device as claimed in claim 1, wherein the object-occlusion determination unit is further configured for hiding the objects other than a target object in the virtual scene and correspondingly generating a target object scene of the target object; the orthographic virtual camera is further configured for obtaining a vertical projection object image of the target object scene;
wherein the object-occlusion determination unit is further configured for obtaining a difference value between the vertical projection object image of the target object scene and a vertical projection object image of the target object of the vertical projection image and determining the occluded-state according to the difference value.

3. The training data generation device as claimed in claim 2, wherein the object-occlusion determination unit is further configured for determining whether the difference value is smaller than a preset value, determining that the occluded-state of the target object is un-occluded if the difference value is smaller than the preset value and determining that the occluded-state of the target object is occluded if the difference value is not smaller than the preset value.

4. The training data generation device as claimed in claim 1, wherein the objects are placed relative to a carrying surface, the perspective virtual camera is further configured for capturing the perspective projection image in a vertical line-of-sight, and the vertical line-of-sight is perpendicular to the carrying surface.

5. The training data generation device as claimed in claim 1, wherein the virtual scene comprises a container within which the objects are placed, the container is placed relative to a carrying surface, the vertical projection image is generated by viewing the virtual scene in the vertical line-of-sight, and the vertical line-of-sight is perpendicular to the carrying surface.

6. The training data generation device as claimed in claim 1, wherein the occluded-state comprises a state which is occluded or un-occluded.

7. A training data generation method implemented by a processor, comprising:
generating a virtual scene, wherein the virtual scene comprises a plurality of objects;
capturing a vertical projection image of the virtual scene;
labeling an occluded-state of each object according to the vertical projection image;
capturing a perspective projection image of the virtual scene; and
generating a training data of the virtual scene according to the perspective projection image and the occluded-state of each object.

8. The training data generation method as claimed in claim 7, wherein the step of labeling the occluded-state of each object according to the vertical projection image comprises:
labeling the occluded-state of each object to be occluded or un-occluded according to the vertical projection image.

9. The training data generation method as claimed in claim 7, further comprising:
hiding the objects other than a target object in the virtual scene;
correspondingly generating a target object scene of the target object;
obtaining a vertical projection object image of the target object scene;
obtaining a difference value between the vertical projection object image of the target object scene and a vertical projection object image of the target object of the vertical projection image; and
determining the occluded-state according to the difference value.

10. The training data generation method as claimed in claim 9, further comprising:
determining whether the difference value is smaller than a preset value;
determining that the occluded-state of the target object is un-occluded if the difference value is smaller than the preset value; and
determining that the occluded-state of the target object is occluded if the difference value is not smaller than the preset value.

11. The training data generation method as claimed in claim 7, wherein in the step of generating the virtual scene, the objects are placed relative to a carrying surface; the training data generation method further comprises:
capturing the perspective projection image in a vertical line-of-sight, wherein the vertical line-of-sight is perpendicular to the carrying surface.

12. The training data generation method as claimed in claim 7, wherein in the step of generating the virtual scene, the virtual scene comprises a container within which the objects are placed, and the container is placed relative to a carrying surface; the training data generation method further comprises:
capturing the vertical projection image in a vertical line-of-sight, wherein the vertical line-of-sight is perpendicular to the carrying surface.

13. A robotic arm system comprising a learning model generated by the training data generation method according to claim 7, comprising:
a robotic arm;
a perspective camera disposed on the robotic arm and configured for capturing an actual object image of a plurality of actual objects;
a controller configured for analyzing the actual object image according to the learning model, accordingly determining an actual occluded-state of each actual object, and controlling the robotic arm to pick up the actual object whose the actual occluded-state is un-occluded.

* * * * *